C. A. MENDENHALL.
WHEEL.
APPLICATION FILED OCT. 28, 1912.
1,120,514.
Patented Dec. 8, 1914.
3 SHEETS—SHEET 1.
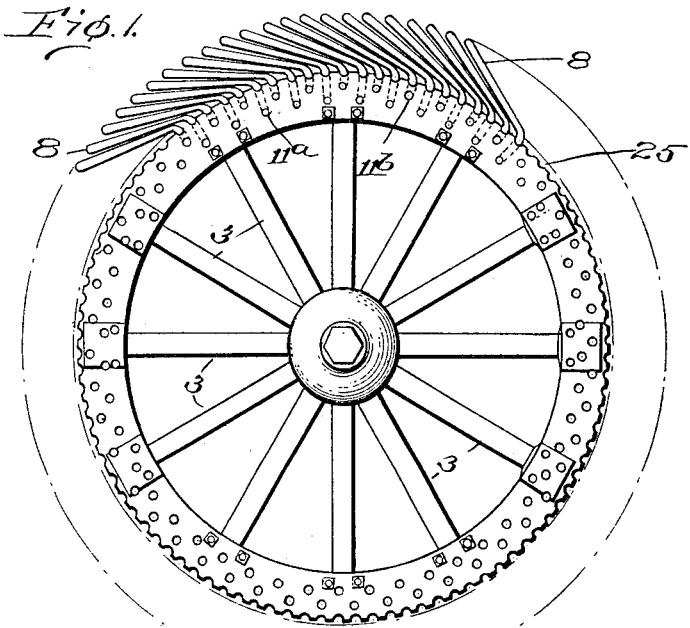
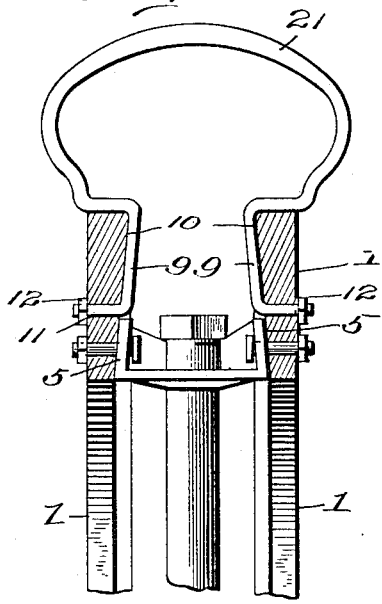
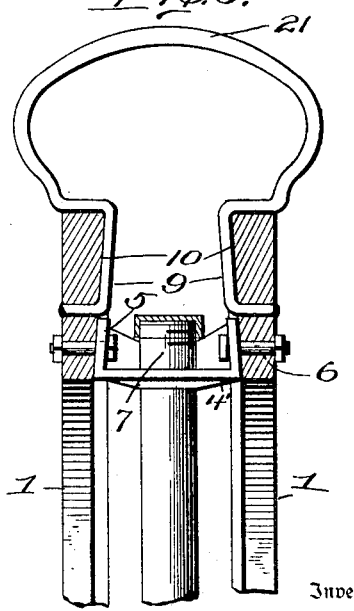
Witnesses
J. M. Fowler Jr.
R. S. Trogner
Inventors
Charles A. Mendenhall
By
Attorney

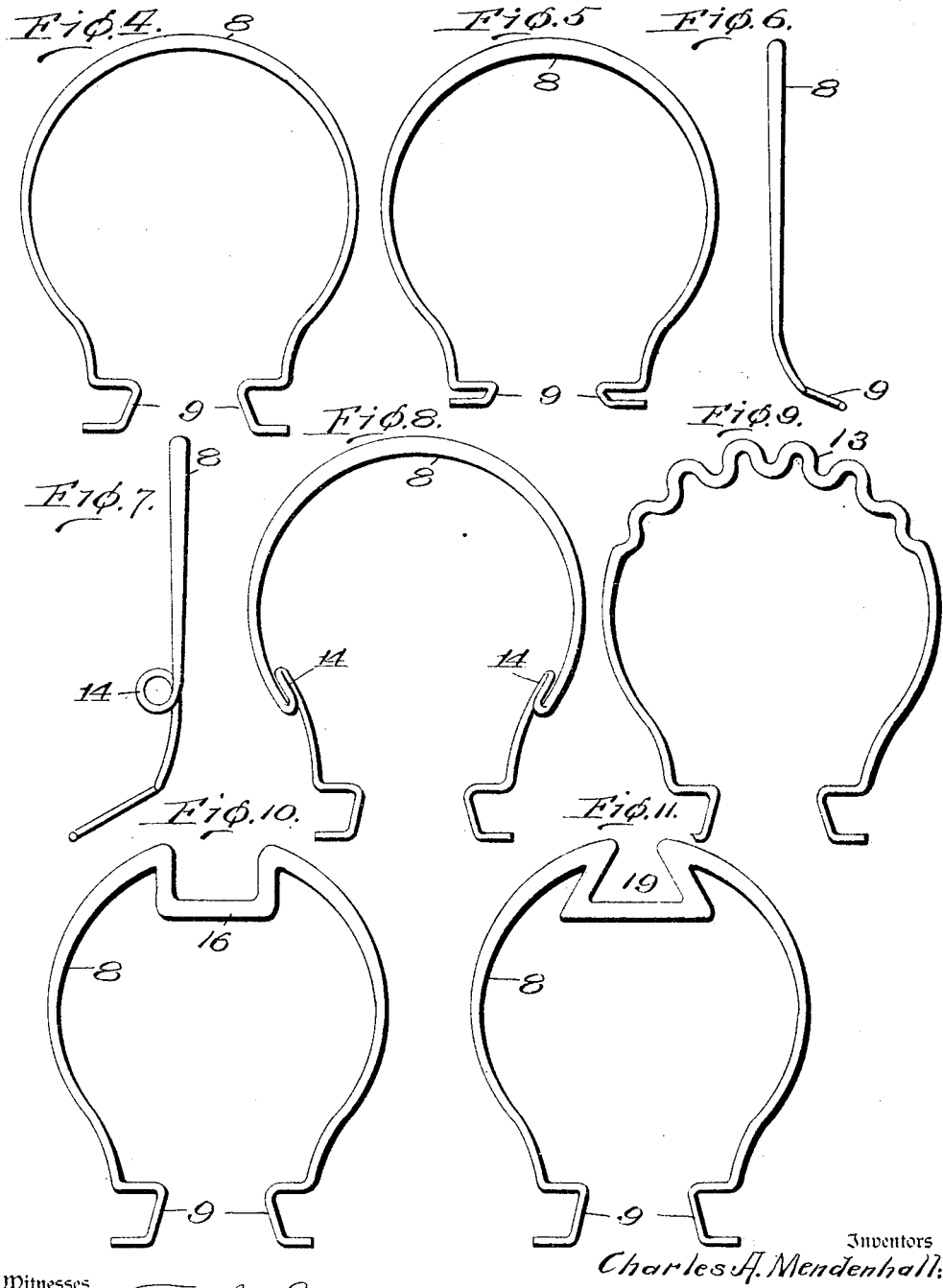

C. A. MENDENHALL.
WHEEL.
APPLICATION FILED OCT. 28, 1912.
1,120,514. Patented Dec. 8, 1914.
3 SHEETS—SHEET 3.
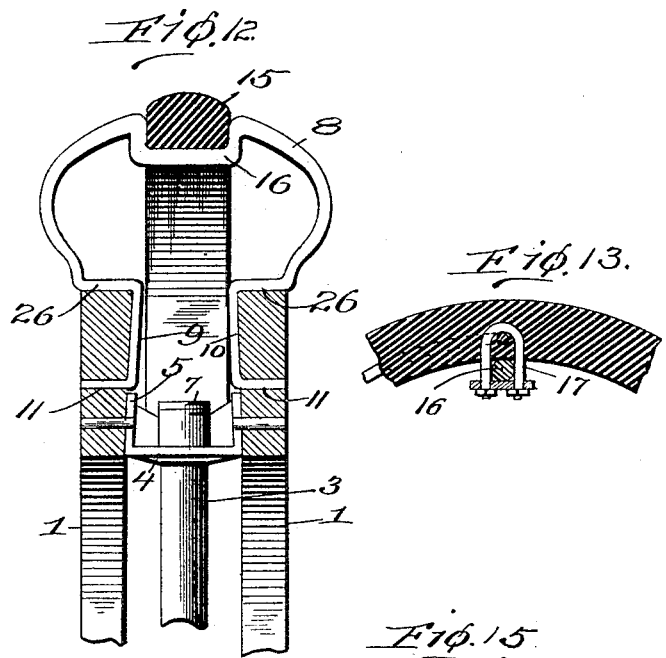
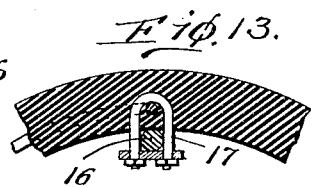
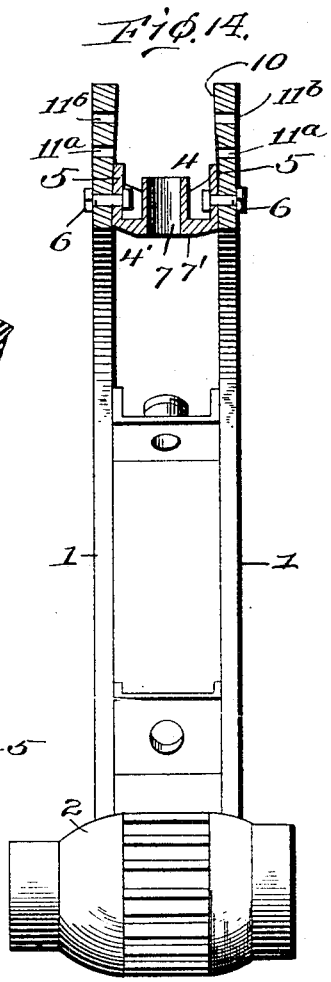
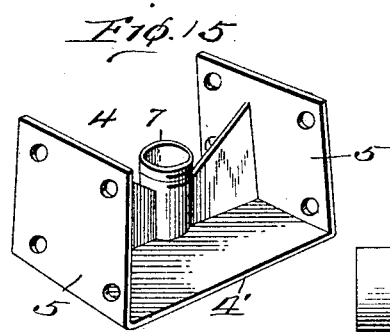
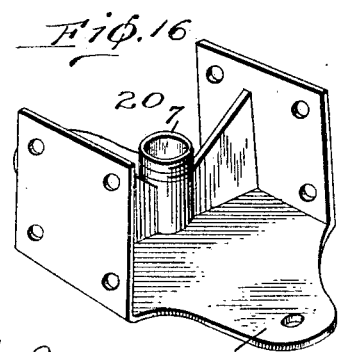
WITNESSES:
INVENTOR
Charles A. Mendenhall
BY
ATTORNEY

UNITED STATES PATENT OFFICE.

CHARLES A. MENDENHALL, OF FARMLAND, INDIANA, ASSIGNOR OF ONE-FIFTH TO WILLARD C. CLEVENGER, OF PARKER CITY, INDIANA, AND ONE-FIFTH TO GEORGE W. ULLOM, OF WINCHESTER, INDIANA.

WHEEL.

1,120,514. Specification of Letters Patent. Patented Dec. 8, 1914.

Application filed October 28, 1912. Serial No. 728,243.

*To all whom it may concern:*

Be it known that I, CHARLES A. MENDENHALL, a citizen of the United States, residing at Farmland, in the county of Randolph and State of Indiana, have invented certain new and useful Improvements in Wheels, of which the following is a specification.

This invention relates to new and useful improvements in wheels for automobiles or other vehicles.

The primary objects of my invention are as follows:—First, to provide a wheel which will be more simple, durable and economical in construction than any of the wheels now in use. Second, to provide a form of wheel that will do away with the use of the pneumatic tire and at the same time afford the same resiliency and easy riding, thus obviating the liability of punctures and blowouts. Third, to so construct the tread portion of the wheel that slipping or skidding is prevented, thus avoiding accidents and fourth to so construct the rims and tread surface of the wheel that it would be impossible for any dirt, mud, stones, etc., to lodge therein.

With the foregoing and other objects in view that will appear as the nature of the invention is better understood, the wheel consists in the novel features of construction, combination and arrangement of parts illustrated in the drawings and more particularly pointed out in the appended claims.

In the accompanying drawings: Figure 1 is a side elevation of the wheel showing a series of the resilient rings or tread members forming the tread surface or tire of the wheel in place. Fig. 2 is a transverse section on an enlarged scale showing how the rims are secured in place and how the wheel is built of two laterally spaced rings. Fig. 3 is a similar view showing another method of securing the rings in place. Fig. 4 is a side view of one of the rings used in the preferred embodiment of the wheel. Fig. 5 is a similar view showing how the legs of the alternate rings are shortened for the purpose hereinafter specified. Fig. 6 is an edge view of Fig. 5. Fig. 7 is a similar view of another form of ring. Fig. 8 is a side view of Fig. 7. Fig. 9 is a side view of another form of ring showing how the tread surface is corrugated to prevent slipping or skidding. Fig. 10 is a side view showing how the central portion of the ring is formed when a solid tire is used for the tread of the wheel. Fig. 11 is a side view showing the central portion of the ring made in dove-tail form to prevent the rubber tire from slipping out of place. Fig. 12 is a transverse sectional view showing the construction used with a solid rubber tire. Fig. 13 is a detail sectional view showing how clips may be used to connect the solid rubber tire with the rings. Fig. 14 is a vertical sectional view taken through the upper half of the wheel with the rings removed and the spoke holders in place. Fig. 15 is a detail perspective view of the preferred form of spoke holder and rim connector and Fig. 16 is a detail perspective view of a modified form of spoke holder.

In the embodiment illustrated, the wheel is constructed of a pair of laterally spaced rims or rings 1 connected with the hub 2 by the spokes 3. The rims are connected together and held in spaced relation by the spoke holders and rim connectors 4 having the horizontal base portions $4^1$ and the angularly bent end portions 5 which fit between the opposite inwardly diverging faces of the rims 1 and are secured thereto by the bolts 6 or other equivalent means.

The spoke holders are arranged at the proper intervals around the circumference of the wheels between the rims and are provided with sleeves 7 to receive the tenons of the spokes 3 above specified. The inner faces of the base portions $4^1$ of the spoke holders are beveled outwardly, as more particularly indicated in Figs. 2, 3, 12 and 14 of the drawings to prevent the accumulation of any mud or foreign matter thereon and have shoulders $7^1$ which provide a bearing for the shoulders at the inner ends of the tenons of the spokes.

By the above construction, it will be apparent that the rims are not only held in properly spaced relation and securely connected together but a holding and spacing means is also provided for the outer ends of the spokes, thereby rendering the frame of the wheel very strong and durable and capable of withstanding a heavy load.

The tread surface of what may be termed the tire of the wheel is formed of a series of resilient tread members or rings 8 which are spaced circumferentially around the rims of the wheel, said rings or tread members being provided with the leg portions 9 which fit against the beveled inner faces 10 of the rims, as more particularly shown in Figs. 2, 3 and 12 of the drawings with the extreme ends of said leg portions bent outwardly at approximately right angles to pass through corresponding transverse apertures 11 formed in the rims of the wheel. The outer ends of said angularly bent portion may be threaded to receive the fastening nuts 12 for securing the tread members to the rims, as shown in Fig. 2 of the drawings or may be riveted to the rims, as shown in the modification illustrated in Fig. 3. Attention is invited to the fact that the leg portions 9 of the tread members are alternately made of different lengths to engage the apertures 11. For example, the leg portions of one tread member or ring are made sufficiently long to permit the right angularly bent portions of legs 9 to pass through the apertures 11$^a$, while the leg portions of the adjacent tread member are made considerably shorter to provide for the engagement of the leg portions with their respective apertures 11$^b$. By virtue of this construction, the apertures 11$^a$ and 11$^b$, as shown by Fig. 1, are disposed in zig-zag relation which enables the nuts 12 to be more easily and readily screwed or unscrewed thereby facilitating the assembling or disassembling of the several component parts of the wheel.

In the preferred embodiment shown in Figs. 1 to 5 inclusive of the drawings, the tread portions of the tread members are made smooth, whereas, in the modification illustrated in Fig. 9 of the drawings, the tread portions are corrugated, as at 13, to provide anti-skidding means.

In the modification shown in Figs. 7 and 8, the tread members or rings are provided with the oppositely disposed coils 14, for the purpose of affording increased resiliency. Where a solid rubber tire 15 is used as the tread of the wheel to make the wheel noiseless, the central portions of the rings 8 are provided with the inwardly bent approximately U-shaped portions 16 to receive the tire. (See Fig. 10.) The tread 15, (see Figs. 10 and 12) may be provided with the inwardly extending clips 17 which straddle and are secured beneath the transverse members 16 of the U-shaped portions and provide a means for securely connecting the rubber tread 15 with the rings 8. If desired, however, the above mentioned fastening means may be dispensed with and the central portions of the rings made in dove-tail form, as at 19. (See Fig. 11.)

In case it is desired to use a felly between the rims, the spoke holder is provided with the ears 20 which extend circumferentially of the wheel and to which the felly is bolted or riveted.

In the operation of the device, the load is supported or sustained by the tread portions 21 of the rings and as the rings are made of steel wire they are sufficiently strong to sustain the load and at the same time have sufficient resiliency to give the effect had with a pneumatic tire.

It will be observed that the tread portions of the rings or tread members are of larger diameter than the leg portions thereof tapering gradually in size from the centers of the rings, the purpose of which will be apparent. The rims are made preferably of steel to provide the greatest strength available and the inner faces thereof are beveled to facilitate the removal of any dirt, rocks or other matter that may lodge between the rims. Each rim may be made in one piece or in two or more sections bolted together. In this connection, however, it may be said that the construction of the wheel, as a whole, is such as will prevent the accumulation of any foreign matter in any of the parts. The outer edges of the rims are notched around the circumference thereof, as at 25, to receive the portions 26 of the rings which prevents any relative or bodily movement or displacement thereof after leaving the ground.

From the foregoing description taken in connection with the drawings, it is thought that the construction, operation and advantages of this invention will be readily understood without requiring a more extended explanation.

Various changes in the form, proportions and minor details of construction will be resorted to without departing from the principles or sacrificing any of the advantages of this invention as defined in the appended claims.

Having described my invention what I claim as new is:—

1. In a resilient wheel for vehicles the combination with oppositely disposed annular rim members independently removable, of spacing means located well below the periphery of said rim members at intervals throughout the circumference of the wheel, and closely assembled ring-like resilient members each secured to both of said rim members and having a tread portion extending transversely across the wheel structure.

2. In a resilient wheel for vehicles the combination with parallel annular rim members independently removable having inwardly diverging opposing faces, of spacing means located well below the periphery of said rim members at intervals throughout the circumference of the wheel, and closely assembled ring-like resilient members each secured to both of said rim members and having a tread portion extending transversely across the wheel structure.

3. In a resilient wheel for vehicles the combination with parallel annular rim members independently removable, of individual connectors located well below the periphery of said rim members at intervals throughout the circumference of the wheel, and closely assembled ring-like resilient members arranged alternately in two circumferential series the members of the several series being secured to both of said rim members in concentric circles and each having a tread portion extending transversely across the wheel structure.

4. In a resilient wheel for vehicles, the combination with parallel annular rim members independently removable having inwardly diverging opposing faces, of individual connecting and spacing elements having flanges of corresponding divergence removably located well below the periphery of said rim members at intervals throughout the circumference of the wheel, and closely assembled ring-like resilient members each secured to both of said rim members and having a tread portion extending transversely across the wheel structure.

In testimony whereof I affix my signature in presence of two witnesses.

CHARLES A. MENDENHALL.

Witnesses:
D. W. GALL,
J. P. DUFFIE.

Copies of this patent may be obtained for five cents each, by addressing the "Commissioner of Patents, Washington, D. C."